UNITED STATES PATENT OFFICE.

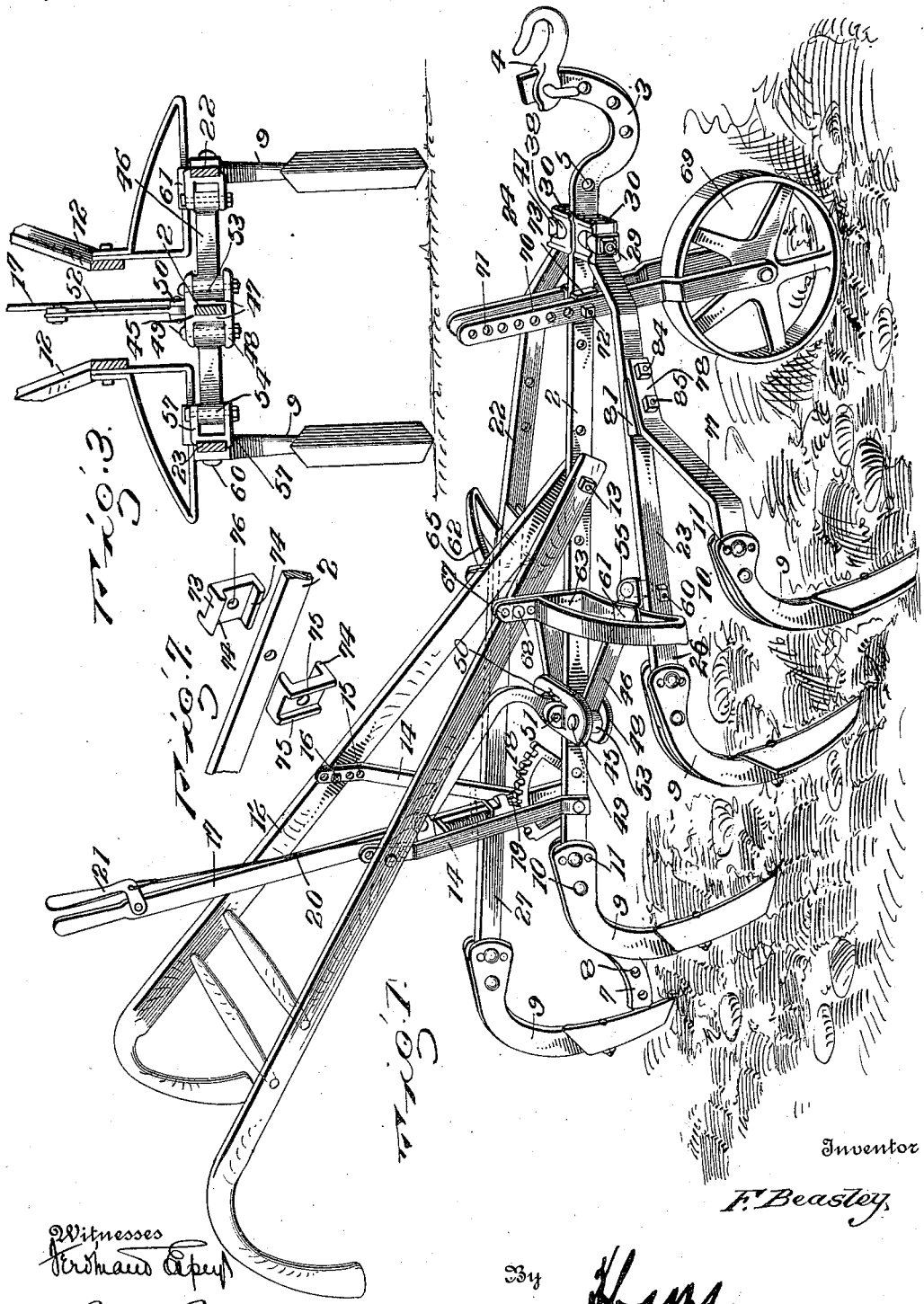

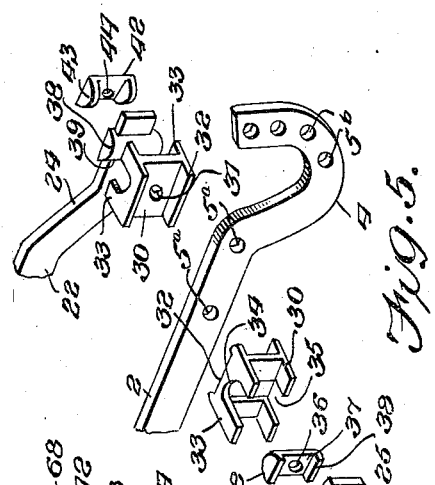

FRANK BEASLEY, OF RICHMOND, VIRGINIA.

ADJUSTABLE-FRAME CULTIVATOR.

1,140,019. Specification of Letters Patent. Patented May 18, 1915.

Application filed January 7, 1913. Serial No. 740,685.

*To all whom it may concern:*

Be it known that I, FRANK BEASLEY, citizen of the United States, residing at Richmond, in the county of Henrico and State of Virginia, have invented certain new and useful Improvements in Adjustable-Frame Cultivators, of which the following is a specification.

My invention relates to cultivators or like agricultural implements, and the primary object of my invention is the provision of a very simple and thoroughly effective cultivator in which the side bars or beams are adjustable laterally, this adjustment being such that it may be effected very readily and under the complete control at all times of the operator.

A further object of my invention is to provide a coupling betweeen the main beam and the side beams of the harrow of such form that the side beams will be supported against twisting strain and lost motion, and further to so construct the coupling that the angle of the side beams relative to the main beams may be readily changed at any time.

A further object of the invention is to so construct the cultivator that the side beams and the extension bar may be readily changed and the cultivator be set up for use as either a right or left hand working cultivator.

A further object is to provide means whereby the handles of the cultivator may be vertically adjusted, and further whereby these handles shall be braced from the side beams.

A further object is to provide means whereby an extension tooth bar or beam may be applied to either one of the side beams and may be angularly adjusted relatively thereto so as to secure a greater or less distance between the extension tooth and the next adjacent tooth of the harrow.

Another object is to provide a cultivator frame in which the side beams are not only pivoted upon the main beam, but to provide for the longitudinal adjustment of the main beam relative to the side beams.

Other objects will appear in the course of the following description.

My invention is illustrated in the accompanying drawings wherein:

Figure 1 is a perspective view of my improved harrow with harrow teeth mounted upon the beams. Fig. 2 is a plan view of the structure shown in Fig. 1. Fig. 3 is a cross section on the line 3—3 of Fig. 2. Fig. 4 is an enlarged fragmentary plan view of the coupling between the side beams and the main beam. Fig. 4$^a$ is a cross section on the line 4$^a$—4$^a$ of Fig. 4. Fig. 5 is a fragmentary perspective view showing the forward portions of the main and side beams and the members forming the coupling attached and separated from each other. Fig. 6 is a perspective view of one of the side beams, the extension tooth beam and the wedge whereby the extension tooth beam is adjusted relative to the side beam, the parts being separated. Fig. 7 is a fragmentary perspective view of the means for coupling the gage wheel supporting bars to the main beam. Fig. 8 is a detail elevation of one of the braces and guides and the slide and coupling for the side beam, the side beam and a portion of the handle being shown in section. Fig. 9 is an inside face view, partly in section of the coupling illustrated in Fig. 8. Fig. 10 is a front elevation of the lever whereby the parts are manipulated, the main beam being shown in section.

Corresponding and like parts are referred to in the following description and indicated in all the views of the accompanying drawings by the same reference characters.

Referring now to Figs. 1 and 2, 2 designates the main beam of the cultivator frame. This beam is straight for a greater portion of its length but its forward end is downwardly bowed as at 3 so as to form an upwardly turned goose neck to which a clevis 4 is attached. This beam is formed with a plurality of perforations 5 and 5$^a$ for the adjustment of the handles and for the adjustment of the side bars as will be later explained. The rear end of the beam is downwardly curved as at 6 and then extends rearward as at 7. This downwardly curved portion and the extension 7 are both perforated as at 8. In Fig. 1 a cultivator tooth 9 is shown as attached to the main beam 2 by bolts 10 extending through the perforations in the cultivator beam. The shank of the tooth is provided with perforations 11 whereby the inclination of the tooth may be adjusted.

Mounted upon the main beam 2 and extending rearwardly therefrom are the upwardly and rearwardly extending handle bars 12 which diverge from each other and which at their lower mating ends are connected to the main beam 2 by means of a transverse bolt 13. At about the middle of the bars 12 are disposed the downwardly and inwardly extending braces 14 which at their lower ends are operatively connected to the main beam 2 and which at their upper ends are formed with a plurality of perforations 15 for the passage of bolts 16. It will be seen that by this means the handles may be raised or lowered through a limited range to adjust the handles to the height of the operator.

Pivotally supported upon the main beam adjacent the forward end tooth shank 9 is a lever 17 which is pivoted to the main beam in any suitable manner and operates against an arched rack 18. The lever 17 has a spring actuated detent tooth 19 adapted to engage the teeth of the rack, this tooth being connected by means of a flexible connection 20 to a hand grip 21 whereby the tooth may be released from the rack to permit the lever to be shifted.

Hingedly connected to the forward end of the main beam so as to be shifted into any desired angular relation thereto are the lateral beams 22 and 23. These side beams are both alike. Each lateral beam is formed of a straight bar which is inwardly bent at its forward end as at 24 and then angularly bent as at 25 (see Fig. 5) so as to extend approximately parallel to the main beam. As illustrated, the lateral beams 22 and 23 extend rearward to a point somewhat forward of the lever 17 and are then slightly angled as at 26 so as to extend more or less parallel to the main beam. These portions 26 are provided with a plurality of perforations whereby extension beams 27 may be attached to the side beams.

The forward ends 25 of each of the beams 22 and 23 are longitudinally slotted as at 28 and the main beam as before stated is provided with a plurality of openings 5 for the passage of a bolt 29.

Disposed on each side of the main beam are the adjustable blocks or supporting members 30. Each of these supporting members are alike and each consists of a vertical web perforated as at 31 for the passage of the bolt 29. The inner face of this web is formed with upper and lower horizontally extending flanges 32 which extend beneath the upper and lower edges of the main beam 2. The opposite face of the web 30 is also provided with upper and lower laterally projecting flanges 33 which are cut away in the arc of a circle as at 34. The inner face of the web is rounded as at 35 to correspond to the cutaway portion of these flanges. It will be seen that these supporting members 30 fit snugly against or around the main beam 2 and are adapted to be adjusted longitudinally thereon.

Disposed in the cutaway portions 34 of each adjustable supporting block is one section 36 of a clip adapted to embrace the forward end of the corresponding side bar 22 or 23. The body portion of this clip has a flat inside face 37 and upper and lower horizontally disposed flanges 38. The inside face of the clip is rounded as at 39 to fit the rounded surface 35 of the block 30 so that it may be rotated therein. Each section 36 is formed with an elongated opening 40 for the passage of the bolt 29. Disposed upon the outer face of the side bar is a clip section 41 formed with a flat outer face, a rounded inner face 42 which outer face, a rounded outer face of the side bar fits against the outer face of the side bar and with upper and lower flanges 43. This clip section is also provided with a perforation 44 for the passage of the bolt 29.

When the parts are assembled, it will be seen that the basal members 30 fit closely against and grip the main beam 2, that the clip section 36 fit rotatively within the cutaway portion 34 of the basal members 30 and embrace the corresponding lateral bar, and that the clip sections 41 also are held with their rounded faces 42 against the outer face of the lateral bar and with their upper and lower flanges embracing the lateral bar and bearing against the flat edges of the flanges 38 on the sections 36. The bolt 29 holds all these parts in close relation and by turning up the nut on this bolt, it is possible to draw the parts as snugly together as desired. The elongated openings 28 and 40 permit the lateral bar and the clip section 36 to have a rotative movement relative to the bolt within limits. It will be seen that the clip section 36 has a firm bearing along its entire length on the cutaway portion 34 and the face 35 of the block 30, and that the curved face of the clip section 41 has a rotative or rocking bearing against the flanges 38.

One of the principal advantages of my invention resides in the hinge joint formed by the members illustrated in Fig. 5. The connection between the lateral beams and the main beam of cultivators of this type has always been a source of trouble because of lost motion and lack of close fitting joints. In all of the cultivators known to me of this type, the ends of the side bars have been bent to a circle in order to engage vertical pivot bolts and they are coupled to the center or main beam by means of iron plates or caps. Since the bolts can not be made to fill up or fit snugly in these holes, they do not hold the side bars rigidly enough so that they will not twist about when they are put under strain, nor do they prevent the side bars from rising and falling. As a consequence of these loose joints, the frame of the cultivator is never rigid, and further the constant use of the cultivator tends to increase this looseness of the joints and is a constant source of trouble.

The coupling shown in detail in Fig. 5 and illustrated also in Figs. 1, 2 and 11 is so formed as to be perfectly rigid so far as twisting strain or up and down movement is concerned, but the coupling permits the lateral beams to be easily rotated to thereby adjust the lateral beams toward or from the main beam so as to permit the cultivator to be used for wide or narrow work. Furthermore it will be noted that the coupling is so constructed that it may be readily adjusted longitudinally along the beam 2 and that the parts of the coupling may be readily taken apart for cleaning, oiling or repairing, or for the purpose of changing the working side of the harrow.

For the purpose of angularly adjusting the beams 22 and 23, I provide a slide 45 of a construction to be hereafter detailed which is slidably mounted upon the beam 2 and which has links 46 which operatively engage with the beams 22 and 23. A front elevation of this slide is illustrated in Fig. 3. The slide comprises a body portion having vertical webs 47 spaced apart sufficiently to receive between them the beam 2 and while sliding upon said beam to resist any twisting strain. Extending across the vertical webs are the horizontal laterally projecting webs 48 through which pass the vertical bolts 49. The upper face of the uppermost horizontal web 48 is formed with ears 50 through which passes a bolt 51 engaging the slide 45 with a link 52, which link is pivotally connected to the lever 17.

Each link 46 at its rear end is formed with an eye 53 surrounding the bolt 49 as illustrated in Fig. 9 and the opposite end of the link is formed with an eye 54 whereby the link is pivotally connected to a beam clip 55 illustrated in Figs. 8 and 9. This beam clip consists of a casting having horizontally disposed, vertically spaced members 56 and 57 spaced apart just sufficient to receive the eye 54 and connected to each other by a vertical web 58 formed with upper and lower longitudinally extending flanges 59 to embrace the side beam 23 and perforated at a plurality of points for the passage of bolts 60. The body portion of each of the clips 55 is formed with a horizontally disposed lip 61 carried upon the upper face of the body portion and adapted to extend over and embrace the lower element of a brace 62 as illustrated in Figs. 8 and 9. There are two of these braces 62 attached at their inner ends to the handle bars 12 and extending laterally over the upper edges of the side beams 22 and 23. Each brace is preferably made of one piece of metal downwardly extending as at 63, then laterally extended as at 64 to form the lower straight flat member of the brace and then rebent as at 65 and extended upward and inward toward the vertical portion 63 and then extended upward as at 66. This upwardly extending portion 66 is provided with a plurality of perforations 67 for the passage of a bolt 68. These perforations 67 permit the handle bars 12 to be raised and lowered in relation to the brace. As will be seen from Fig. 1, these braces which also form guides for the clips 55 are slightly curved upon an arc whose center is the axis for the corresponding lateral beam 22 or 23.

It will be seen now that when the lever 17 is shifted forward, the slide 45 will move forward forcing the links 46 outward and causing the clips 55 to shift laterally outward upon the flat straight bars 64 forming the lower member of the brace, and that when the lever 17 is drawn rearward the reverse will occur, the slide 45 will be drawn rearward, and that this will act to retract the lateral beams. It will further be seen that these lateral beams may be held in any desired adjusted position by engagement between the detent tooth 19 and the rack 18.

The gage wheel 69 is supported by vertical bars 70 formed with perforations 71 for a bolt 72. These bars engage clips 73 illustrated in Fig. 7. The clips are formed with horizontal flanges 74 which brace the beam 2 and with vertical flanges 75 embracing the adjacent bar 7. Each clip is perforated at 76 for the bolt 72.

Attachable to either one of the beams 22 or 23 and illustrated in Fig. 1 as attached to the beam 23 is supplementary beam 77. This consists of a flat bar bent at its forward end to extend approximately parallel to the side bar 23 as at 78 (see Fig. 6) and bent at its rear end so as to extend approximately parallel to the lateral beam 23 and perforated for engagement with the tooth shank 9. This tooth shank 9 like the tooth shank previously described as attached to the main beam is bifurcated at its forward end and provided with perforations 11 for the passage of a bolt 10. The forward end 78 of the beam 77 is provided with a plurality of perforations 79 corresponding to perforations 80 in the beam 23. Interposed between the supplementary beam 77 and the beam 23 is an adjusting wedge 81 formed with a longitudinally extending slot 82 and formed upon its upper edge with laterally projecting flanges 83 adapted to extend over the upper edges of the bars 23 and 78 respectively. Through the foremost perforation 79 passes a bolt 84, while through the rearmost perforation 79 passes a bolt 85. This bolt also passes through the slot 82 of the wedge 81. It will be seen that by forcing this wedge in to a greater or less extent, the extension tooth beam 77 may be angularly adjusted with relation to the beam 23 (or the beam 22) and that the parts may be held in rigid angular relation to each other when the bolt 85 is tightened. It will also be seen that the flanges 83 tend to prevent any vertical movement of the connected parts.

The beam 27 (see Fig. 2) which is adapted to be attached either to the beam 22 or 23 extends rearward beyond the main beam 2 and mounted upon its end is a cultivator tooth 9 of the same construction as that previously described. The beam 23 is also shown as carrying at its inner extremity a cultivator tooth 9.

The braces or links 46 in my construction are disposed edgewise and therefore have a maximum of resistance to vertical strain and they are also bent to a very close circle at each end and then drilled out for just the proper size for the passage of the bolts which connect them to the slide 45 and the clips 55. It will be seen that the couplings 55 also engage with the handle braces 62 in such manner as to make a perfectly rigid coupling so far as up or down twisting movement is concerned between the side bars of the cultivator and the handle braces, but that a perfectly free and easy sidewise movement is allowed when opening or closing the side beams in or out as is done when operating the lever 17.

Especial attention is also called to the wide and close fitting bearing connection between the braces 62 and the clips 55. This close fitting wide bearing with a close fitting bolt to connect the two parts makes a perfect hinge joint, and this construction will hold the lateral beams of the cultivator particularly rigid even with the links or braces 46 omitted. There is no lost motion and any twisting strain to which the side beams 22 or 23 may be submitted with be resisted by the full strength of the braces 62. Any up and down movement of the side beams relative to the main beam will also be resisted by these braces. These braces are particularly strong by reason of the fact that they are held from vertical movement by the upwardly and inwardly extending element 65. Furthermore, the braces 46 or links act to prevent any sidewise movement by reason of the fact that their inner ends are closely embraced by the upper and lower flanges of the slide 45 and that this slide snugly fits the beam 2 and resists any sidewise movement.

It is to be noted that with my improved construction all the parts are so constructed and fitted that while they move easily, twisting or torsional stress will not act to loosen the joints to any perceptible extent. It will furthermore be seen that the cultivator as illustrated in Figs. 1 and 2 may be rearranged so as to provide either a right hand or a left hand harrow, and that any number of cultivator teeth may be used, and further that the supplementary beam 77 may be placed either on one or the other side of the machine, and it will further be seen that the handle may be adjusted longitudinally of the beam 2 and may be adjusted vertically, that the clevis 4 may be adjusted relative to the goose neck 3, and that the depth of the gage wheel may be adjusted.

Furthermore, it is pointed out that the cultivator teeth may be instantly set to suit any desired width row so that no time is lost by the necessity of unscrewing nuts and removing bolts and then adjusting the lateral beams to the proper width and then replacing the bolts and tightening up the nuts. The adjustment is done instantly and when adjusted the parts are held rigidly in their adjusted position. Furthermore it is possible by my construction to open the cultivator frame to its full width, cultivate the rows and then close up the frame and go between the rows.

While I have illustrated what I consider to be the best form of my invention, I do not wish to be limited thereto as it is obvious that many minor changes might be made therein without departing from the spirit of the invention.

What I claim is:

1. A cultivator of the character described including a main cultivator beam, lateral cultivator beams hinged to the main cultivator beam for movement in a horizontal plane, handles extending up from the main cultivator beam and pivoted thereto at their forward ends, braces attached to the handles rearward of the pivot thereof and extending laterally out therefrom and over the lateral cultivator beams and having sliding engagement therewith, a lever mounted upon the main beam, and link connections between said lever and the lateral beams, whereby to provide means for manually operating said links to laterally adjust the lateral cultivator beams relative to the main beam.

2. A cultivator of the character described including a main supporting beam, a main cultivator beam, lateral cultivator beams hingedly connected to the main cultivator beam for movement in a horizontal plane, handles projecting upwardly and rearwardly from the main beam, braces for said handles extending downward and then out at right angles and resting upon but slidingly engaged with the upper edges of the lateral cultivator beams, slides on the laterally extending portions of the braces and attached to the lateral cultivator beams, a longitudinally movable slide mounted upon the main beam, a lever mounted on the main beam, a link connection between said lever and the slide and link connections between said last named slide and the first named slides.

3. A cultivator of the character described including a main cultivator beam, lateral cultivator beams hingedly connected to the main beam near the forward end of the latter, braces disposed on each side of the main beam and extending laterally over and having sliding engagement with the upper edges of the lateral beams, a slide mounted upon the main beam, a lever pivoted to the main beam, a link connecting the slide and lever, outwardly and forwardly extending links pivotally connected to the slide, and members attached to the lateral cultivator beams and having sliding engagement with the said braces and pivotal engagement with the links.

4. A cultivator of the character described including a main cultivator beam, lateral cultivator beams hinged to the main beam for movement in a horizontal plane, upwardly and rearwardly extending handles mounted upon the main beam, opposed braces, each being approximately triangular in form and attached at one side to the corresponding handle and having its base extending over the corresponding lateral beam, a slide mounted upon the main beam and having sliding engagement therewith, manually operable means for shifting said slide, links extending outward and forward from the slide, and members attached to the lateral beams and having sliding engagement with the base of the triangular braces, to which members the forward ends of the links are pivoted.

5. In a cultivator comprising a main beam and lateral beams connected at their front ends to the main beam and laterally adjustable at their rear ends, a slide mounted upon the main beam and comprising upper and lower ears, coupling members secured against the inner sides of the lateral beams and formed with outwardly extending ribs engaging the upper and lower edges of such lateral beams and formed with inwardly extending upper and lower ears, links having eyes at opposite ends and having their rear eyes arranged between the ears of the slide, said links extending forwardly and outwardly and having the eyes at their front ends arranged between the ears of the coupling members, fastenings pivotally connecting the eyes of the links to the ears of the slide and coupling members, respectively, and means for moving the slide upon the main beams to effect horizontal adjustment of the lateral beams.

6. In a cultivator, the combination with a main beam and a lateral beam, of a coupling for pivotally connecting the two and comprising a block having upper and lower pairs of spaced flanges, the outer face of the block being formed with an arcuate seat between said flanges, coacting members having flanges embracing the side beam, one of said members having a curved face complementary to the curved face of the block, and a bolt passing through the members, the block and said beams.

7. In a cultivator, the combination with a main beam, a lateral beam, of a coupling for pivotally connecting the beam to the main beam and comprising a block having on one face upper and lower horizontally disposed flanges for embracing the main beam and having on its outer face upper and lower pairs of spaced flanges, said face being formed between said flanges with a concavely curved seat, coacting members each having upper and lower horizontally disposed flanges embracing the lateral cultivator beam and being disposed, one upon the outer face of the cultivator beam and one upon the inner face thereof, the member disposed upon the inner face having a convexly curved face adapted to seat in and have rotatable engagement with the recess in the block, said upper and lower pairs of flanges on the block extending over and supporting the lateral cultivator beam.

8. In a cultivator, the combination with a main beam and a lateral beam, of coupling members therefor including a basal member adapted to engage the main beam, side beam clamping members, one of the clamping members on one face and the basal member on the adjacent face being complementarily curved whereby to provide a pivoted connection between the side beam and the main beam, and a bolt passing through the coupling members and the said beams.

9. In a cultivator, the combination with a main beam and a lateral beam, of a coupling therefor including a basal member adapted to engage the main beam and having its outer face formed with upper and lower pairs of flanges and a middle concavely curved recess, lateral beam clamping members adapted to embrace the lateral beam, one of said clamping members having a convex face adapted to fit in and have rocking engagement with said basal member, and a bolt passing through the clamping members and the beams.

10. In a cultivator, the combination with a main beam and a lateral beam, of a coupling therefor including a basal member having on its outer face upper and lower pairs of projecting flanges, the said outer face being formed with a concave recess, and clamping members adapted to embrace the side beam and each formed with upper and lower flanges engaging over the edges of the lateral beam and one of said clamping members having its inner face rounded to conform to the recess in said basal member, the lateral beam and said last named clamping member being formed each with a longitudinal bolt slot, and a bolt passing through the clamping members, the basal member and said beams.

11. In a cultivator, the combination with a main beam and a lateral beam, of a coupling therefor including a basal member adapted to engage the main beam and having outwardly projecting pairs of upper and lower flanges, and a concavely curved recess between said flanges, lateral beam clamping members each having upper and lower flanges embracing the lateral beam, the inner face of the inner clamping member being rounded to conform in curvature to the recess in the basal member, and the upper and lower flanges and the inner face between said flanges of the outer clamping member being concavely curved to have rocking contact with the inner clamping member, said inner clamping member and the lateral beam being longitudinally slotted, and a bolt passing through the clamping members, through the basal member and the main and side cultivator beams.

In testimony whereof I affix my signature in presence of two witnesses.

FRANK BEASLEY.

Witnesses:
E. R. MacBryde,
F. G. Sawril.

Copies of this patent may be obtained for five cents each, by addressing the "Commissioner of Patents, Washington, D. C."